United States Patent
Kirchberg

[19]

[11] Patent Number: 6,058,386
[45] Date of Patent: May 2, 2000

[54] DEVICE FOR DESIGNING A NEURAL NETWORK AND NEURAL NETWORK

[75] Inventor: Karl-Heinz Kirchberg, Karlsruhe, Germany

[73] Assignee: Siemens Aktiengesellschaft, München, Germany

[21] Appl. No.: 08/913,839

[22] PCT Filed: Mar. 14, 1996

[86] PCT No.: PCT/DE96/00454

§ 371 Date: Dec. 8, 1997

§ 102(e) Date: Dec. 8, 1997

[87] PCT Pub. No.: WO96/28785

PCT Pub. Date: Sep. 19, 1996

[30] Foreign Application Priority Data

Mar. 14, 1995 [DE] Germany ............ 195 09 186

[51] Int. Cl.$^7$ ................................. G06F 15/18
[52] U.S. Cl. ................... 706/26; 706/25; 706/28; 706/31; 706/41
[58] Field of Search ................ 706/25, 26, 28, 706/31, 41, 16

[56] References Cited

U.S. PATENT DOCUMENTS

| | | | |
|---|---|---|---|
| 5,201,026 | 4/1993 | Tsuiki | 706/28 |
| 5,220,618 | 6/1993 | Sirat et al. | 382/14 |
| 5,317,675 | 5/1994 | Ikehara | 706/31 |
| 5,479,574 | 12/1995 | Glier et al. | 706/25 |
| 5,701,398 | 12/1997 | Glier et al. | 706/41 |
| 5,742,741 | 4/1998 | Chiueh et al. | 706/41 |
| 5,751,913 | 5/1998 | Chiueh et al. | 706/41 |
| 5,950,181 | 9/1999 | Federl | 706/16 |

FOREIGN PATENT DOCUMENTS

| | | |
|---|---|---|
| 0 602 717 | 6/1994 | European Pat. Off. . |
| WO 94/06095 | 3/1994 | WIPO . |

OTHER PUBLICATIONS

Roan, Sing–Ming, Fuzzy RCE Neural Network, Second IEEE International Conference on Fuzzy Systems, New York, NY, Mar. 28, 1993. p.629–34, vol. 1 of 2.

Shyu, Haw–Jye, Classifying Seismic Signals via RCE Neural Network, International Joint Conference on Neural Networks, Piscataway, NJ, IEEE, Jun. 17, 1990, p. 101–105.

D. Casasent et al. "Adaptive Clustering Neural Net For Piecewise Nonlinear Discriminant Surfaces" International Joint Conference On Neural Networks pp. 423–428 (Jun. 1990).

*Primary Examiner*—Tariq R. Hafiz
*Assistant Examiner*—Wilbert L. Starks, Jr.
*Attorney, Agent, or Firm*—Kenyon & Kenyon

[57] ABSTRACT

The invention relates to a device for designing a neural network, in which to determine the number of neurons (21 ... 24) in the intermediate layer, the domain of the input signal (X1, X2) in question is subdivided into a predefinable number of subdomains, and in the case of a multiplicity n of input signals (X1, X2), the n-dimensional value space of the n input signals is subdivided in conformance with the subdomains in question into n-dimensional partial spaces, and the supporting values (xi, yi) of the training data are assigned to the subdomains or partial spaces, and the subdomains or partial spaces having the most supporting values are selected, and in which case, for each selected subdomain or partial space, provision is made for a neuron in the intermediate layer preceding the output layer. The device according to the invention can be advantageously used for designing neural networks where the training data are unevenly distributed. The invention is generally suited for applications in neural networks.

11 Claims, 1 Drawing Sheet

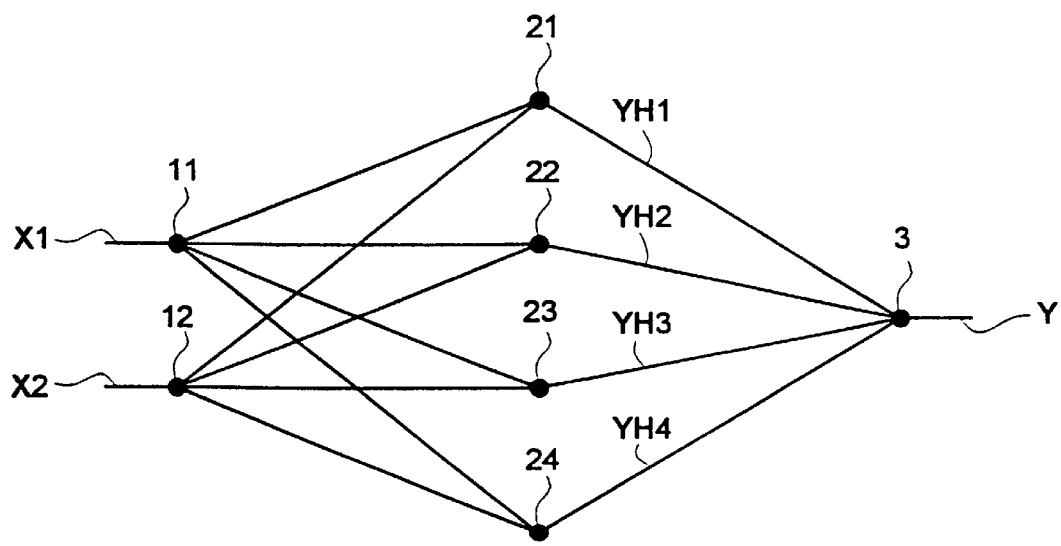
FIG

DEVICE FOR DESIGNING A NEURAL NETWORK AND NEURAL NETWORK

FIELD OF THE INVENTION

The present invention is directed to a device for designing a neural network, as well as to a neural network that can be produced in accordance with the device.

BACKGROUND INFORMATION

A customary method for presetting the parameters of neural networks is through initialization with random numbers and subsequent optimization. The disadvantages associated with this method are, however, that the neural networks that are obtained are not reproducible, and they do not always produce meaningful results when there is a substantially uneven data distribution. For that reason, even with the same training data, repeated calculations of the network parameters can lead each time to different parameter sets. In this context, it is difficult to compare the results to one another. When the parameters change, it cannot be determined on the basis of the non-reproducible results whether these changes are caused solely by changed training data.

PCT Published Application No. WO 94/06095 describes a device for designing a neural network that is capable of producing reproducible results for training data records. In this context, the parameters of the neural network are calculated by solving a linear system of equations. The design process can be roughly divided into two steps: first, equally distributed auxiliary quantities are introduced onto the domain of the input signals to define the parameters of the neurons in the intermediate layer; the parameters of the output neurons are then each determined by solving a system of equations. When, to assure the local effectiveness of the neurons, a function having a characteristic bell-shaped curve is used for the non-linear elements in the neurons of the intermediate layer, the known device has the drawback that the number of neurons required in the intermediate layer is dependent on the number of auxiliary quantities, so that a large number of neurons is required for a neural network that has satisfactory interpolation properties.

SUMMARY OF THE INVENTION

An object of the present invention is to provide a device for designing a neural network that, even with a smaller number of neurons in the intermediate layer, will produce a neural network having satisfactory interpolation properties.

The neural network design device of the present invention is capable of producing a neural network having a number of neurons in an intermediate layer that is optimally adapted to the distribution of the training data. In this context, this can be a three-layer network, i.e., a neural network having an input layer, an intermediate layer, and an output layer. The device can be used for any desired number of input and output neurons.

The device first subdivides the domains of the input signals independently of one another into subdomains. The division is carried out on the basis of the frequency distribution of the training data, which can also be described as supporting interpolation values. The subdomains can be selected to be equal in size in each case for the input signals and should not overlap one another. It is also possible, however, to establish a finer subdivision into subdomains in higher-frequency sections. With n input signals, the combinations of individual subdomains yield n-dimensional partial spaces of the domains. The training data are allocated to the partial spaces. The partial spaces are then sorted in the order of the number of training data they contain. The user can then assess the quality of the selected distribution based on the training data contained in the individual partial spaces. One criterion, for example, when working with training data from the same partial space, is how far apart the output signal values lie. Those partial spaces having the most training data are selected for further processing. Each of the selected partial spaces is represented by a neuron in an intermediate layer of the neural network. Thus, the number of neurons in the intermediate layer is set by the selection of the partial spaces. Each partial space contains at least one supporting interpolation value. For each input, the arithmetic average of the supporting interpolation values of the input signal is calculated. These average values can then be used as offsets in the non-linear elements of the neurons of the intermediate layer, whose characteristic curve resembles a bell-shape. This enables the neuron in the middle of the supporting interpolation values of the partial space in question to be maximally effective.

The width of the bell-shaped curves can be predefined by the user. The width is what determines the interpolation properties of the neural network. The user can define the width, visually aided by the bell-shaped curve, by specifying the output value that the non-linear element should still have at the boundary of the partial space in question. Usually this value is 0.5, but should lie at least within a range of between 0.1 and 0.9. The larger the value is, the larger is the range of effectiveness of the bell-shaped curve. The matrix that is set up with the supporting interpolation values and the values of the output signals of the neural network yields a nearly diagonal structure and, therefore, can be easily inverted. The weights of the neurons in the output layer can be computed by any suitable method using a compensating calculation.

BRIEF DESCRIPTION OF THE DRAWING

The drawing illustrates a neural network that is obtainable with the design device in accordance with the present invention.

DETAILED DESCRIPTION

The drawing shows a three-layer neural network having two inputs X1 and X2, as well as one output Y. The two inputs X1 and X2 lead to two neurons 11 and 12, respectively, in the input layer. Through neurons 11 and 12, signals applied to inputs X1 and X2 are routed to neurons 21 . . . 24 in the intermediate layer. Neurons 21 . . . 24 process the input signals and, on the basis of these input signals, generate output signals YH1 . . . YH4 of the intermediate layer. From this, an output neuron 3 supplies an output signal which can be tapped off at output Y. Although the drawing depicts a network having three layers, with two inputs and one output, it should be appreciated that the present invention encompasses neural networks having various numbers of layers, inputs, or outputs.

In the intermediate layer, neurons are used, whose non-linear elements, when mapped onto the domain of their input signals, resemble a bell-shaped curve, ensuring local effectiveness. One can draw additionally, for example, upon neurons having rbf (radial-base function) properties. Output values yHj of a neuron 2j with radial-base function and a plurality of inputs Xi can be given as:

$$yHj = \exp\left(-0.5 * \sum_{i=1}^{n} (Sij^2 * (xi - x0ij)^2)\right)$$

In this equation, the variable n is used for the number of inputs of the neural network. Parameter Sij specifies the weighting and x0$ij$ the offset to the signal value xi in question at input Xi in neuron 2$j$ of the intermediate layer. The position of neuron 2$j$, i.e., the location of its local effectiveness, is established with offsets x0$ij$. The further removed input values xi are from offset x0$ij$ in question, the smaller output value yHj of neuron 2$j$ of the intermediate layer becomes. Weights Sij influence the width of the bell-shaped curve for the specific input Xi.

In an rbf network, an output signal value y in a neuron 3 of the output layer is calculated from output signal values yHj of neurons 2$j$ of the intermediate layer as:

$$y = \sum_{j=1}^{p} (wj * yHj)$$

Thus, in neuron 3, the output signal values yHj are each multiplied by output weights wj, and the resultant products are summed up. If the neural network has a plurality of outputs, then a plurality of such equations can be formulated in a comparable manner with output weights that deviate from one another. Variable p specifies the number of neurons 2$j$ in the intermediate layer.

In an rbf1 network, output-signal value y of a neuron of the output layer is calculated as follows:

$$y = \frac{\sum_{j=1}^{p}(wj * kj * yHj)}{\sum_{j=1}^{p}(kj * yHj)}$$

Output-signal values yHj of neurons 2$j$ in the intermediate layer are weighted once more separately with the values of parameters kj. rbf1 networks have the advantage over rbf networks that, when they are designed using the method described below, they supply output signals with less ripple content and, therefore, better interpolation properties, since at input values for which the bell-shaped curves of the individual non-linear elements are only weakly effective, their output signals are raised as the result of a division by the sum of output signal values yHj of neurons 2$j$ of the intermediate layer, which in these instances becomes small.

A suitable device for carrying out the design process can be, for example, a properly programmed computer having input and output means.

The design method goes beyond the "training" of a neural network, since, on the basis of supporting interpolation values for the input and output signals of the neural network, not only its parameters, but also its structures are influenced. On the basis of the supporting interpolation values, the domain of each input signal is determined and subdivided, in each case, independently of one another into partial spaces. In this context, the subdomains are equal in size and do not overlap one another. In order to minimize the computing time for each domain, a subdivision into 120 subdomains is initially selected. The values of the input signals contained in the supporting interpolation values are subsequently distributed among the corresponding subdomains. The allocation can take place in accordance with the following formula:

$$pos = trunc\left[k * \frac{x - x\_min}{x\_max - x\_min}\right]$$

pos$\geq$k, then=k=k−1 end

In this context, pos is the identifier of the subdomain obtained for a value x of input signal X; k is the number of subdomains for the input in question, in this case 120. The function trunc removes the decimal places from the result of the expression written in brackets, so that an integer value of between 0 and 119 is obtained for the position number pos.

The domain defined by the limits x_min and x_max does not necessarily have to include all input signal values that arise. Values lying below x_min thus yield a negative value for position number pos. By suitably expanding the formula, they can be assigned to position number pos=0 and, thus, to the lowest subdomain. Correspondingly, values of input signal x, which lie above x_max, yield in accordance with the formula a result for position number pos$\geq$k, thus pos$\geq$120, and in accordance with the formula can be assigned to the uppermost subdomain with pos=119. The allocation to the subdomains is carried out for all supporting interpolation values. A count is then made of how many supporting interpolation values come to rest in each subdomain. Thus, a frequency distribution of the supporting interpolation values for the distribution in question is obtained.

As will become apparent in the following description, subdividing the domain of each input variable into 120 subdomains would result in a very fine distribution and would lead to very large neural networks. Value 120 is selected for minimizing the computing time, because it is the smallest common multiple of 2, 3, 4, 5, 6, 8, and 10. For designing the neural network, it is, namely, crucial above all that a domain be divided into less than ten subdomains. By initially selecting k=120, the computing time for the subsequent steps is reduced, since to determine the frequency distribution for larger subdomains, merely the corresponding frequency values of the subdomains have to be combined from the distribution with k=120. This means that to divide a domain into two subdomains, it is necessary to sum the frequency values of the first 60 subdomains (pos=0 . . . 59) for subdomain 1, and it is necessary to sum the frequency values of the last 60 subdomains (pos=60 . . . 119) for subdomain 2. For subdivisions into three, four, five, six, eight, or ten subdomains, one can proceed accordingly. The advantage of this type of calculation is that it is only necessary to allocate the supporting interpolation values once to the subdomains in the division, with k=120. The rougher divisions can be obtained after that simply by combining the corresponding frequency values of this distribution again.

At this point, a division with a value k1 is selected, which is supposed to be so calculated that, on the one hand, as many subdomains as possible are created and, on the other hand, the distribution of the supporting interpolation values over the subdomains is as uneven as possible. This means that as many supporting interpolation values as possible should lie in a few subdomains, and many subdomains should not contain any supporting interpolation values. In addition, however, it should be considered that when working with a network having few inputs, more subdomains of an input signal may contain supporting interpolation values, to ensure that a predefined maximum number of neurons 2j in the intermediate layer is not exceeded.

There is no need to use any scaled quantities for the division; the division can be carried out on the basis of the physical values. In addition, when partitioning the domains, it is also possible to include technical aspects in the consideration. For example, when certain operating ranges of the process are known, this knowledge can be included when selecting the distribution. In this manner, one distribution is determined separately for each input. Thus, for n inputs, one obtains k1 . . . is kn values. Because of the multiplicity of possible combinations of the individual subdomains, $$kv=k1*k2* \ldots *kn$$

n-dimensional partial spaces are produced. The more inputs are present, the more partial spaces are created. Given an uneven distribution of the supporting interpolation values, however, training data are not contained in all partial spaces, rather there will be partial spaces that do not contain any supporting interpolation values. The following information can be indicated to an operator to assist him or her in setting the number of subdomains:

| For two inputs: | k = 10 | → kv = 100 |
| For three inputs: | k = 5 | → kv = 125 |
| For more than three inputs: | k = 3 | → kv = $3^n$ |

This distribution suffices for a rough overview. One can use the selected distribution or select a different distribution.

When there are a plurality of inputs, the supporting interpolation values are assigned to the n-dimensional partial spaces. Depending on the number of inputs, the subdomains or partial spaces are ranked in accordance with the number of supporting interpolation values contained in each of them. For this, an n-digit integer posv is formed, which in its digits pos1 . . . posn contains the respective identifiers of the subdomain of the individual input values of a supporting interpolation value. The individual digits are defined in accordance with the above named equation. Thus, one obtains values posi, which lie between 0 and ki−1. Therefore, when working with supporting interpolation values which are established n-dimensionally by n input variables, the integer posv has n digits. It can be represented as:

$$posv=pos1+10*pos2+100*pos3+\ldots.10^{n-1}*posn$$

The position of the digits indicates its input dimension, the value of the digits the respective subdomain. The n-digit number posv represents the identifier of the partial space to which a supporting interpolation value is assigned.

The posv identifiers are further processed individually. The value of each posv identifier represents a partial space, and the number of posv identifiers corresponds to the number of supporting interpolation values. At this point, the posv identifiers are sorted by size.

It is then determined how often the same identifiers occur, i.e., how many supporting interpolation values lie at any one time in the same partial space. The relevant partial spaces can now be determined from the multiplicity of partial spaces obtained by combining the individual subdomains. Those partial spaces in which the supporting interpolation values lie are relevant. For that, the posv identifiers are sorted and listed in accordance with the frequency of their occurrence. In the neural network, each relevant partial space is represented by a neuron in the intermediate layer. It is now specified, how many of the relevant partial spaces should be mapped onto neurons of the intermediate layer. For example, if value 15 is specified, then the first 15, i.e., the 15 partial spaces having the most assigned supporting interpolation values are selected. In a favorable distribution, these partial spaces contain about 90% of the supporting interpolation values. At the same time, value 15 specifies how many neurons in the intermediate layer of the neural network are provided.

If too many partial spaces are created with one or only a few supporting interpolation values, then the distribution has been selected to be too fine, and the design should be begun again with a rougher distribution.

The output values of the supporting interpolation values will now be considered which were able to be assigned to a relevant partial space. Interesting in this context is how far apart the output values for supporting interpolation values lie, which are assigned to the same partial space of the input values. The neuron in the intermediate layer will form in the corresponding partial space only one value as a type of average value. If the output values lie closely together, then a good distribution has been selected with respect to this partial space. If, on the other hand, the values lie far apart, then the partial space is too large. In such a case, one should begin again with a design using a finer distribution partitioning of the domains of the input signals. Thus, what is necessary here is to find a compromise between the two design goals "low number of required partial spaces" and "high level of attainable accuracy". A remedy would be to so expand the design process that when the domains of the input signals are partitioned, one also considers the domains of the output signals, and that from the subdomain combinations, partial spaces with larger dimensions are formed. In the partial spaces, those supporting interpolation values are then combined which possess similar input values and similar output values. This can be carried out either all-inclusively for all supporting interpolation values or only for the supporting interpolation values in the relevant partial spaces.

Offsets x0ij of neurons 2j of the intermediate layer are calculated on the basis of the supporting interpolation values in the relevant partial spaces. Each partial space contains at least one supporting interpolation value. For each input Xi, the arithmetic average value of input values xi in question is calculated from the supporting interpolation values. These average values are then used as offsets x0ij in neurons 2j. As a result, the effectiveness of neuron 2j covers all supporting interpolation values in the partial space in question. This has an advantageous effect on the interpolation properties of the neural network, since ripple factors caused by the offsets x0ij of distant outlying supporting interpolation values are avoided.

The width of the bell-shaped curves can now be established by properly selecting parameters Sij. It determines the interpolation properties of the neural network. As a standard setting, parameter S can be so selected that a neuron whose offset lies in the middle of a subdomain, at the boundary of the subdomain, thus at a distance of ½ki from the middle, supplies an output value, which amounts to half of the maximum value. This can be expressed by the following formula:

$$\exp\left(-0.5*Sij^2*\left(\frac{1}{2*ki}\right)^2\right) = \frac{1}{2}$$

Thus, for this standard setting, one obtains parameter Sij as:

$$Sij = 2*ki*\sqrt{2*\ln(2)}$$

In place of this standard setting, it can also be advantageous in special cases to so select parameter Sij that neuron 2j at the boundary of the subdomain supplies an output value yHj=A, which lies more or less between 0.1 and 0.9. With this, the interpolation properties of the neural network can be influenced:

$$Sij = 2*ki*\sqrt{2*\text{abs}\left(\ln\left(\frac{1}{A}\right)\right)}$$

In response to a large output value A, the profile of output signal Y of the neural network becomes smoother. In the case of supporting interpolation values, which are not represented by a neuron 2j of the intermediate layer, the error is smaller. In response to a small output value A, the profile is more angular, and the error becomes larger.

The output weights ai of neuron 3 in the output layer are calculated using the compensating equation. In a neural network having a plurality of outputs, a neuron of the output layer is assigned to each output, and the output weights of the neuron in question are calculated using the same procedure, as described below for one output. For values yi of output signal Y, which are contained in supporting interpolation values (xi, yi), equations are drawn up, where values mij of signals YHij supplied by neurons 2j of the intermediate layer are multiplied in each instance by corresponding weights ai and are added. If i is used as a row index and j as a column index, then one obtains a linear system of equations M * a=Y, whose matrix M approximates a diagonal structure. In this context, output weights ai are calculated for all supporting interpolation values, thus also for those which have not been considered during the selection of the relevant partial spaces.

The larger one selects the output values of neurons 2j to be at the boundary of a subdomain by setting parameter S, the greater the linear dependency of the equations becomes. This, in turn, increases the calculated output weights ai. The smaller the output values of the neurons are selected to be, the smaller the determined output weights become as well. This method can be used to calculate the output weights of rbf and rbf1 networks. In this context, as already mentioned above, rbf1 networks have better interpolation properties than rbf networks. For the calculation of the rbf1 network, the value 1 is specified for all weights ki, to prevent the number of unknowns of the system of equations from rising unnecessarily, and to ensure that the system of equations is solvable.

If desired, all parameters can be improved in a subsequent numerical optimization. The previously described design process supplies favorable initial values for the optimization. This enables supporting interpolation values, which lie outside of the relevant partial spaces, to be considered as well to an even greater extent.

When optimizing the network parameters, it is useful to retain the offsets of the neurons. This means that the position of neurons 2j in the intermediate layer should not be changed. only output weights ai, the widths of the bell-shaped curves with parameters Sij, and, optionally, the weights ki should be changed.

When the position of the neurons is shifted, interpreting the network parameters becomes difficult, since one no longer knows which neuron is responsible for which partial space. In addition, the neuron centers can wander out of the domain of the input signals.

An exemplary device according to the present invention for designing a neural network operates as follows.

To define the subdomains, the device displays the number i of input signal Xi. For k=120, a table with the frequency distributions on the subdomains is output and graphically displayed. The operator selects a value that seems appropriate for ki. After that, the next input is processed. After the subdomains of all inputs are defined, all selected values ki are output. In addition, the resultant number of possible partial spaces is indicated. The user can take over these settings or begin anew with the defining of the subdomains.

The device outputs the relevant partial spaces in a table with their identifiers and with the number of supporting interpolation values they contain. The partial spaces are sorted according to the number of supporting interpolation values. The user must input how many of these partial spaces are supposed to be used. The device outputs what percent of the supporting interpolation values lies in the selected partial spaces. If too many partial spaces have been created, then one can begin anew, and define a new distribution of the subdomains.

To assess the quality of the subdomains, a table is output comprised of the number of the subdomain, the number of supporting interpolation values it contains, the average value of the input and output values contained therein, and the minimum and maximum value in question.

On the basis of this information, the user can assess the quality of the distribution. The user must acknowledge this output or define a new distribution. In a graphic display, given two inputs X1 and X2, the subdomains can still be displayed in the plane. The partial spaces correspond then to the field in a two-axis representation, in each instance with the subdomains of one input signal on both axes.

When there are more than two inputs, a different representation should be used. In the following, a data set will be considered having three inputs (X1, X2, X3) and one output. Each input is divided into three subdomains of the same size, which do not overlap one another. The division can be different for each input. The inputs are arranged one over another as follows:

| X3 | 111 | 112 | 113 | 121 | 122 | 123 | 131 | 132 | 133 | 211 | 212 | 213 | 221 | 222 | 223 | 231 | 232 | 233 |
|----|-----|-----|-----|-----|-----|-----|-----|-----|-----|-----|-----|-----|-----|-----|-----|-----|-----|-----|
| X2 |     | 11  |     |     | 12  |     |     | 13  |     |     | 21  |     |     | 22  |     |     | 23  |     |
| X1 |     |     |     |     |     | 1   |     |     |     |     |     |     |     | 2   |     |     |     |     |

Inputs X1, X2, and X3 are situated one over another. In the bottom-most plane is input X1, which is divided into two subdomains. Above this, lies input X2. This input was partitioned into three subdomains. On the top lies input X3, which likewise has three subdomains. The digits in the fields are the identifiers of the subdomains. The uppermost plane contains all possible partial spaces which result from the selected distribution. The supporting interpolation values are now distributed over the partial spaces of the uppermost plane and displayed, for example, by entering the number of the supporting interpolation values assigned to the partial spaces in question. By this means, one can recognize how many supporting interpolation values lie in the individual partial spaces. From this frequency distribution, one can easily read off which partial spaces have been over-represented with supporting interpolation values and which have not been given enough consideration. In addition, for each partial space, the corresponding output values can be indicated. One can recognize from the scattering of the output values of a partial space, whether the partial space perhaps had been selected to be too large. When bars are used to represent the number of supporting interpolation values in the individual partial spaces in the uppermost plane, the result is a sort of bar code display of the training data distribution. The position of the bars stipulates the partial space in question; the width of the bar corresponds to the number of supporting interpolation values. The operator can now input whether the standard value S=0.5 should be used or whether the output value of a neuron 2j of the intermediate layer at the boundary of a partial space should have a different value.

The other parameters of the neural network are then calculated automatically by the device. When the calculation is complete, the user can check the quality of the neural network that is obtained. After that, an optimization algorithm can be optionally started, and its result can likewise be checked by the operator.

Thus, the device for designing a neural network of the present invention enjoys the following advantageous properties: the domain, which is predetermined by the training data, is subdivided into defined and reproducible subdomains or partial spaces. On the basis of the training data and their distribution over the individual subdomains or partial spaces, one can assess the quality of the selected distribution. In this context, the criteria are: (1) How many subdomains have been created? (2) How many training data lie in the individual subdomains? (3) To what extent are the input data scattered in the selected subdomains? (4) To what extent are the output data scattered in the selected subdomains?

Special display mechanisms enable one to obtain a rapid overview of the training data distribution. Relevant subdomains are represented by neurons in the intermediate layer. One can, therefore, predict in which subdomains the neural network performs better or worse.

The device also has the distinction of a clear and comprehensible operator prompting. There is no need for the data to be divided into training and test data. The quality of the training data can also be assessed on the basis of the distribution carried out by the operator; that is, the operator can determine already on the basis of the distribution, whether the data set is suited for designing a neural network. Since there is no need to initialize any parameters of the neural network with random values, the results of the network design are always reproducible. The interpolation properties of the neural network are only influenced by one factor, namely parameter S, which defines the output value of the neurons of the intermediate layer at the boundary of the subdomains or partial spaces. In addition, when distributing the domains of the input signals, user knowledge about the origin of the training data or the application-specific use of the neural network can be taken into consideration as well.

What is claimed is:

1. A method for designing a neural network, comprising the steps of:

providing at least one input to the neural network;

providing at least one output from the neural network;

providing a plurality of layers disposed one behind the other, the plurality of layers comprising an intermediate layer and an output layer;

providing a plurality of neurons in each of the plurality of layers, each of the neurons of the intermediate layer including at least one non-linear element;

weighting a plurality of input signals to the neural network in the neurons of the intermediate layer, gating the input signals with one another and with the non-linear element of at least one associated neuron of the intermediate layer as a type of bell-shaped curve, which is predominantly effective locally on a domain of the input signals;

generating at least one output signal from the neurons of the intermediate layer;

assigning an output neuron of the output layer to each one of the at least one output of the neural network;

routing the at least one output signal to a corresponding one of the at least one output of the neural network, wherein supporting values for the input signals and the at least one output signal are predefinable;

determining the domain of the input signals;

subdividing the domain of each input signal into a predefinable number of subdomains in order to determine the number of neurons in the intermediate layer;

subdividing an n-dimensional value space of the input signals, in conformance with the subdomains, into n-dimensional partial spaces;

assigning the supporting values to one of the subdomains and partial spaces, and selecting the one of the subdomains and partial spaces having the most supporting values; and for each selected one of the subdomains and partial spaces, providing a neuron in the intermediate layer preceding the output layer.

2. The method according to claim 1, further comprising:

determining a plurality of weights required for generating an output signal of the neural network from each output signal of the neurons of the intermediate layer by solving a linear system of equations M *a=Y, which is comprised of equations for output signal values of the supporting values, wherein M represents a matrix comprising each one of the at least one output signal of the neurons of the intermediate layer, wherein a represents the plurality of weights, wherein Y represents the output signal of the neural network, wherein each value of each output signal supplied by each neuron of the intermediate layer is multiplied in each instance by at least a corresponding weight, and wherein the resulting multiplication products are added to one another.

3. The method according to claim 1, wherein, in the neurons in the output layer, the output signals of the neurons of the intermediate layer are added in a gating element to produce an output signal of the neural network, and are divided by a sum of the output signals of the neurons of the intermediate layer, and wherein the weights necessary for generating the output signal of the neural network are determined by solving a system of equations, which is comprised of equations for the supporting values of an output signal value of the network multiplied by the sum of the at least one output signal of the neurons of the intermediate layer, wherein each value of each output signal supplied by each neuron of the intermediate layer is multiplied in each instance by at least a corresponding one of the weights, and wherein the resulting multiplication products are added to one another.

4. The method according to claim 1, wherein an offset for each one of the neurons in the intermediate layer, which determines a location of maximum effectiveness of an associated non-linear element of each neuron of the intermediate layer, is selected as an arithmetic average value of the input signal values of the supporting values situated in the one of the subdomain and partial space.

5. The method according to claim 1, wherein a predetermined number of subdomains is selected on a predetermined domain when the output signal values produced from input signal values from one of the same subdomain and partial space lie further than a predetermined distance from one another.

6. The method according to claim 1, wherein a domain of the output signal of the neural network is subdivided into a predefined number of subdomains, and wherein the supporting values, whose output signal values lie in one of the same and at least adjacent subdomains, are allocated to one of the same subdomains and partial spaces of the input signals.

7. The method according to claim 1, wherein a distribution of the supporting values over one of the subdomains and partial spaces is optically displayed.

8. The method according to claim 1, wherein a distribution of the supporting values over one of the subdomains and partial spaces is displayed as a bar code, in which for each one of the subdomain and partial space, provision is made for a bar code having one of a thickness and length representing the number of assigned supporting values.

9. The method according to claim 1, wherein any one of the subdomains and partial spaces are equal in size.

10. The method according to claim 1, wherein a width of the bell-shaped curves can be selected by a user.

11. A neural network designed in accordance with the method of claim 1.

* * * * *